(12) United States Patent
Molchanov

(10) Patent No.: US 12,431,965 B2
(45) Date of Patent: Sep. 30, 2025

(54) MULTI-BEAM MULTI-BAND PROTECTED COMMUNICATION SYSTEM

(71) Applicant: Pavlo Anatoliyovich Molchanov, Las Cruces, NM (US)

(72) Inventor: Pavlo Anatoliyovich Molchanov, Las Cruces, NM (US)

(*) Notice: Subject to any disclaimer, the term of this patent is extended or adjusted under 35 U.S.C. 154(b) by 651 days.

(21) Appl. No.: 17/740,581

(22) Filed: May 10, 2022

(65) Prior Publication Data

US 2023/0370153 A1 Nov. 16, 2023

(51) Int. Cl.
*H04W 64/00* (2009.01)
*H04B 7/185* (2006.01)

(52) U.S. Cl.
CPC ..... *H04B 7/18513* (2013.01); *H04B 7/18517* (2013.01)

(58) Field of Classification Search
CPC ............ H04B 7/18513; H04B 7/18517; H04B 7/18515; H04B 7/2041
See application file for complete search history.

(56) References Cited

U.S. PATENT DOCUMENTS

| | | | | |
|---|---|---|---|---|
| 2015/0024677 | A1* | 1/2015 | Gopal | H04B 7/18515 455/13.1 |
| 2018/0323863 | A1* | 11/2018 | Bournes | H04B 10/118 |
| 2020/0119811 | A1* | 4/2020 | Kay | H04B 7/2041 |
| 2023/0370158 | A1* | 11/2023 | Tran | H02S 10/40 |
| 2024/0250751 | A1* | 7/2024 | Schloemer | H04B 7/18563 |

FOREIGN PATENT DOCUMENTS

WO  WO-2020014497 A1 * 1/2020 ......... H04B 7/18513

* cited by examiner

*Primary Examiner* — Julio R Perez

(57) ABSTRACT

Multi-beam, multi-band, multi-function, non-scanning, non-switching system which can simultaneously be applied for communication, navigation, control, surveillance, and data link. Antenna system with multiple overlap fixed beams provides simultaneous full/hemi-sphere covering without scanning or switching beams and provides higher data rates, reliability, and speed of communication. Automatic gain control and direction adjustment in each channel allow to use system in harsh urban or mountain conditions even on motion payload. Antenna systems coupled with transmitters and receiver chains arranged as transceiver modules can be distributed on the ground, airborne, sea carrier/satellite, or swarm of carriers or satellites and provide better protection against spoofing and EMP.

4 Claims, 10 Drawing Sheets

MULTI-BEAM MULTI-BAND PROTECTED COMMUNICATION SYSTEM

REFERENCES CITED

US Patent Documents

| | | |
|---|---|---|
| U.S. Pat. No. 6,272,317 B1 | Aug. 7, 2001 | Sam W. Houston |
| U.S. Pat. No. 6,388,634 B1 | May 14, 2002 | Parthasarathy Ramanujam |
| U.S. Pat. No. 10,051,487 B2 | Aug. 14, 2018 | Anthony Noerpel |
| U.S. Pat. No. 6,628,919 B1 | Sep. 30, 2003 | Charles Curello |
| U.S. Pat. No. 9,716,547 B2 | Jul. 15, 2017 | David Alan Roos |
| U.S. Pat. No. 10,903,898 B1 | Jan. 26, 2021 | Satyajit Ray |
| US 20140035783 A1 | Feb. 6, 2014 | Pavlo A. Molchanov |

OTHER PUBLICATIONS

1. Stephen Harman, "Holographic Radar Development", Microwave Journal, Aveillant Ltd., Cambridge, UK, February 2021.
2. Stephen E. Lipsky, "Microwave Passive Direction Finder", SciTech Publishing Inc. Raleigh, NC 27613, 2004.
3. Pavlo A. Molchanov, Ashok Gorwara, "Fly Eye Radar Concept". IRS2017. International Radar Symposium, Prague, July 2017.

PRIOR ART

Wide channel bandwidths and relatively large beamwidths making satellite-based communication systems more suited to point-to-point trunking service rather than to end-user connectivity [U.S. Pat. No. 6,272,317 B1]. The wide area coverage and constrained flexibility of these systems make any attempt to serve many small users both inefficient and costly (FIG. 1). Such systems provide connection with a plurality of communications satellites each having uplink and downlink antennas capable of receiving and transmitting a plurality of signals utilizing a plurality of beams having fixed spot beams and scanned spot beams to a plurality of spot coverage areas and a plurality of scanned spot areas respectively at a predetermined range of frequencies. The plurality of satellites each have receiving and transmitting beam forming networks coupled to the uplink and downlink antennas respectively. The antennas have adjacent reconfigurable receiving and transmitting antenna elements. The advantage of the invention is that the satellite system allows the use of both fixed and scanned spot beams from the same satellite and the same antenna. The invention allows fixed coverage over high-traffic areas while allowing scanned beams to be quickly moved between areas not requiring a dedicated fixed beam. Such communication network consists of a lot of separate systems which are large and costly. Moreover, the system does not cover the entire sky at any time and cannot exclude media influence in separate communication channels. The monopulse method with application reference beams can help to solve this problem.

System for changing antenna direction to satellite (FIG. 2) presented in patent (U.S. Pat. No. 10,903,898 B1). A system comprises a computer including a processor and a memory. The memory stores instructions executable by the processor such that the computer is programmed to change a satellite antenna direction from a first sky segment to a second sky segment, to change the satellite antenna direction to return to the first sky segment upon updating segment blockage status data including a location and a score of the second sky segment, and to change the satellite antenna direction to a third sky segment based at least in part on the segment blockage status data. Changing the antenna direction to another sky segment can lead to the loss of part of transmitting/receiving information and decreasing data rate.

The multi-beam antenna communication system presented in (FIG. 3) comprises a plurality of rings of single-beam reflectors, each reflector having its own feed, wherein the plurality of rings is substantially concentric or nested and disposed on separate planes such that the reflectors of adjacent rings are substantially interleaved. (U.S. Pat. No. 6,388,634 B1). The system cannot provide a full sphere covering area.

Multibeam non-scanning antenna system applied in radar system for detection of incoming munition proposed by Stephen A. Harman [1]. The system consists staring antenna array and beam covering. Application of 360 degrees staring antenna array instead scanning antenna array provides a wider area of observation and holographic technology with beamforming of receiving signals decreasing the time of processing.

Lipsky S. E. in U.S. Pat. No. 4,257,047 (1981) proposed an antenna array consists a plurality of fixed, narrow beamwidth antennas, geographically oriented to provide omnidirectional coverage, as a set of antennas is selected. It presents an explanation of the monopulse method for microwave direction finding with two pairs of directional antennas, positioned by azimuth and elevation boresight [2]. Direction finding by way of amplitude comparison methods can provide a root mean square (RMS) accuracy smaller than 2° in 100 ns after a direct wave arrives. High-accuracy phase measurements provide high accuracy and fast direction finding. Most importantly, the monopulse method does not require a long time, from milliseconds for small amount operations to tens of seconds, computer calculations, and can provide critical information about the target's position, speed, and identity.

The array of directional antennas with overlap antenna patterns and multi-channel signal processing provides higher direction-finding accuracy, direction adjustment possibility, and faster signal processing [3].

BACKGROUND OF THE INVENTION

The present invention is related to electric communication techniques, and ground and satellite-based stations. More particularly, the present invention relates to arrangements for interconnecting multiple systems, for construction, operations control, administration, and maintenance.

Anthony Noerpel in U.S. Pat. No. 10,051,487 B2 from Aug. 14, 2018 "Method and system for orientating a phased array antenna" proposed to make receive planar phased array antenna divided into segments, for example, four, or more, symmetric segments. The sub-array signals from the four quadrants are combined to derive azimuth and elevation difference signals. When the array is nominally pointed at a known location that is transmitting a known signal, the azimuth and elevation difference signal levels may be used to estimate an array pointing or platform attitude error in the azimuth and elevation directions. In exemplary embodiments, this pointing error estimation process does not interfere with the primary purpose of the array, for example, to receive user traffic over beams pointed at cells in a cell coverage area. Pointing error estimation is performed simultaneously with the reception of user data. The present teachings are applicable to satellite systems at different altitudes from Low Earth Orbit (LEO) to Geosynchronous Earth Orbit (GEO); to mobile, portable, and aeronautical satellite terminals; to high altitude platforms or unmanned aircraft carrying a communications payload; to automated/motorized antenna positioners.

Pointing phase array antennas based on phase control, which are directly connected with frequency. It means that the bandwidth of the antenna array will be in trade with antenna gain. Increasing the number of communication channels will lead to decreased gain in each channel.

David Alan Roos in patent "Method and apparatus for beam selection for multibeam, multi-satellite communications", U.S. Pat. No. 9,716,547 B2 from Jul. 25, 2017 proposed a multi-satellite communication system, comprising an antenna, receiver, and transmitter, and a processing module configured to calculate a normalized distance metric for the plurality of user spot beams of a first and second satellite, select the user spot beam with the lowest normalized distance metric, and determine which of the at least first or second satellite is transmitting the selected user spot beam. Network includes determining the coverage area of a first beam pattern of a first satellite; identifying a number of high traffic regions within the coverage area of the first beam pattern; determining which user spot beams of the first beam pattern cover the identified high traffic regions; determining the normalized distance metrics for the identified user spot beams for each high traffic region; and designing a second beam pattern of a second satellite such that at least one center of a user spot beam of the second beam pattern have a lower normalized distance metric relative to the high traffic regions than the user spot beams of the first beam pattern.

However the calculation of a normalized distance metric for the plurality of user spot beams takes some time, which can lead to a decreasing data rate and loss of some useful communication information.

Presented by Satyajit Roy in patent U.S. Pat. No. 10,903, 898 B1 from Jan. 26, 2021 "Changing antenna direction based on satellite blockage detection" system comprises a computer including a processor and a memory. The memory stores instructions executable by the processor such that the computer is programmed to change a satellite antenna direction from a first sky segment to a second sky segment, to change the satellite antenna direction to return to the first sky segment upon updating segment blockage status data including a location and a score of the second sky segment, and to change the satellite antenna direction to a third sky segment based at least in part on the segment blockage status data. Changing the antenna direction to another sky segment can lead to the loss of part of transmitting/receiving information. The system comprises a computer that is programmed to change a satellite antenna direction from a first sky segment to a second sky segment, to change the satellite antenna direction to return to the first sky segment upon updating segment blockage status data including a location and a score of the second sky segment, and to change the satellite antenna direction to a third sky segment based at least in part on the segment blockage status data. The score may be at least one of fully blocked, medium blocked, low blocked, or unblocked. The segment blockage status data may further include a type of blockage including at least one of a building, vegetation, or a weather condition.

Processing of executable instructions by the processor will take some time, which can delay communication. Changing the antenna direction to another sky segment by switching can lead to the loss of part of the transmitting/receiving information. Monopulse systems continuously covering the entire sky can increase data rate and quality and speed of communication.

SUMMARY OF THE INVENTION

An objective of the present invention is the development of a multi-beam, multi-band, multi-function, non-scanning, non-switching system that can simultaneously be applied for communication, navigation, control, surveillance, and datalink. Antenna systems with multiple overlap fixed beams can provide simultaneous full/hemisphere covering without scanning or switching beams and provide higher data rates, reliability, and speed of communication. Automatic gain control and direction adjustment in each channel will allow to use system in harsh urban or mountain conditions. Antenna systems coupled with transmitters and receiver chains arranged as transceiver modules can be distributed on the ground, airborne, sea carrier/satellite, or swarm of carriers or satellites and provide better protection against spoofing and EMP.

Multi-beam multi-band protected communication system using satellites in the constellation Low Earth (LEO), Medium Earth (MEO), and Geostationary (GEO) orbits consist plurality of fixed beams antennas covering areas of satellites use. Fixed beams of neighboring antennas overlap in quadrature or multi-axes directions and simultaneously continuously cover the entire area of possible satellites using. Each fixed beam antenna is coupled with a separate transceiver chain comprising a transmitter and receiving chain. The plurality of said fixed beams antennas coupled with transceiver chains arranged as transceiver modules distributed by some order on carrier/satellite, vehicle or distributed between swarm or constellation of carriers/satellites to cover a subdivided sector of possible satellites using area. Each transceiver module covering a subdivided sector of the entire area of possible satellites using and comprising of monopulse processor for simultaneous multi-axis processing of all signals in receiving chains as the ratio of amplitudes and/or phase shift of signals for adjustment signals to decrease pointing error to transmitter and one-iteration adapting to decrease media influence to communication channels parameters by a phase shift in set of neighboring antennas with overlap fixed beams. Each transceiver module comprising an analog-to-digital converter and is also connected to a signal processor with memory for storing executable instructions and for separate processing of amplitudes, phases, frequency components shift of signals in receiving chains and transmitters. Fixed beam antennas coupled to separate receiving chains, transmitters, and monopulse processor inside said transceiver module are connected to the signal processor by digital interface, arranged as universal serial bus (USB) or microwave and/or fiber optic waveguides. Each transceiver module comprising separate Automatic Gain Control (AGC) means, comprising a signal detector and adjustable amplifier coupled to the receiver chain, and as minimum one transmitter power amplifier, wherein the output of the signal detector connected to control input of the transmitter power amplifier and adjustable amplifier in the receiver chain. All transmitters, receiver chains, monopulse processor, and signal processor are connected with synchronization means by a digital interface.

In another embodiment communication system comprising transceiver modules and signal processor arranged for simultaneous transmitting, receiving, and processing of signals on a few different frequencies (multi-frequency signals)

and comprising corresponding arranged antennas and filtering means in each transmitter and receiving chain.

In another embodiment communication system comprising transceiver modules and signal processor arranged for simultaneous transmitting, receiving and processing of different modes of signals, such as communication, navigation, control (multi-mode signals), and comprising corresponding arranged antennas and filtering means in each transmitter and receiving chain.

In another embodiment communication system comprising transceiver modules and a signal processor is arranged for adjustment communication direction based on return signals status data based on at least one specified cycle time or a priority of user data being communicated via a subarray of neighboring antennas with overlap fixed beams.

DETAILED DESCRIPTION OF THE INVENTION

Figure 1:
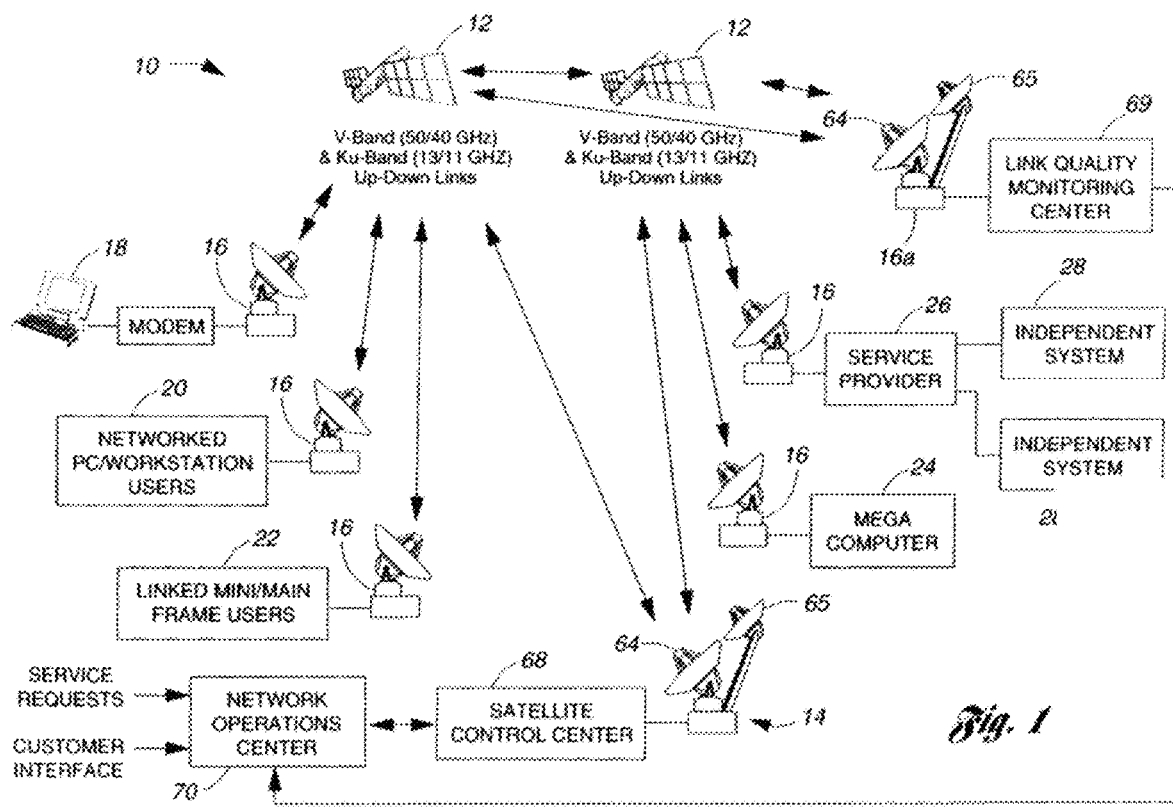
FIG. 1 illustrates the satellite communication system including a plurality of fixed spot beams and scanned spot beams.
Figure 2:
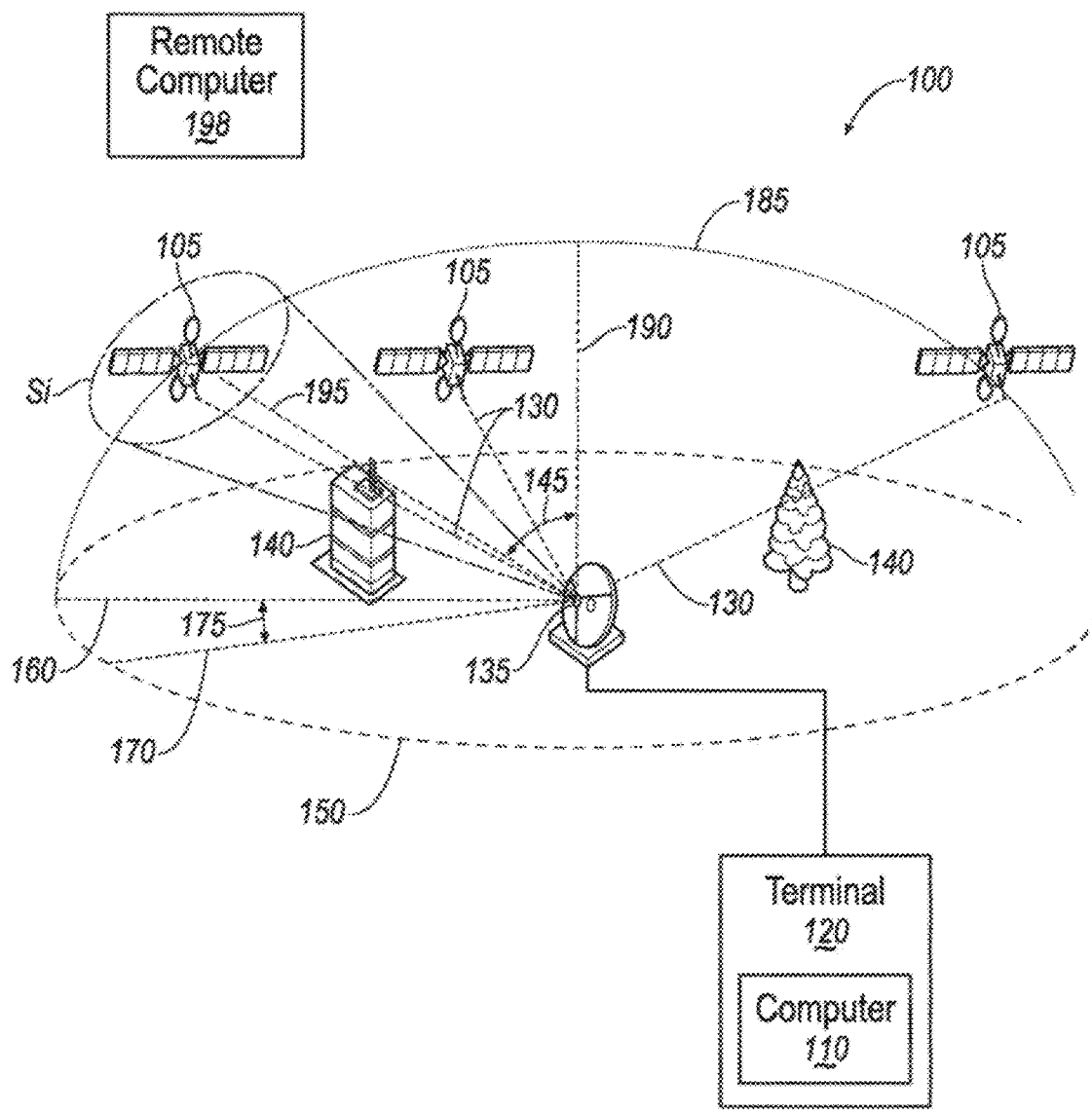
FIG. 2 shows a known system, comprising a computer including a processor programmed to change a satellite antenna direction.
Figure 3:
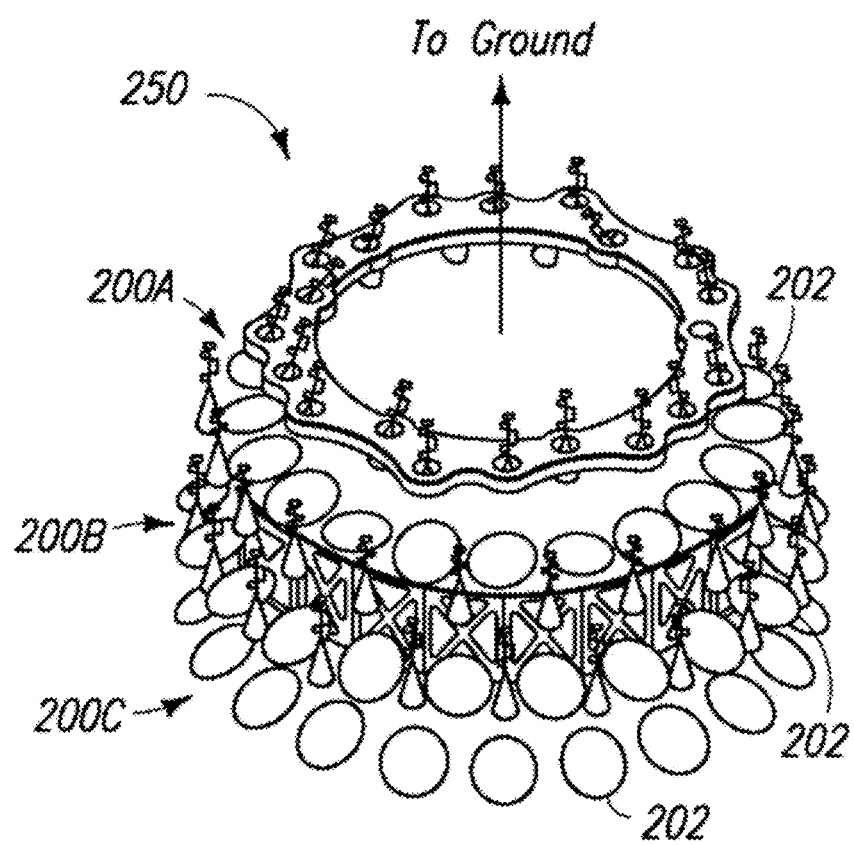
FIG. 3 shows a multi-beam antenna communication system with an antenna arranged as a multi-beam reflector antenna array.
Figure 4:
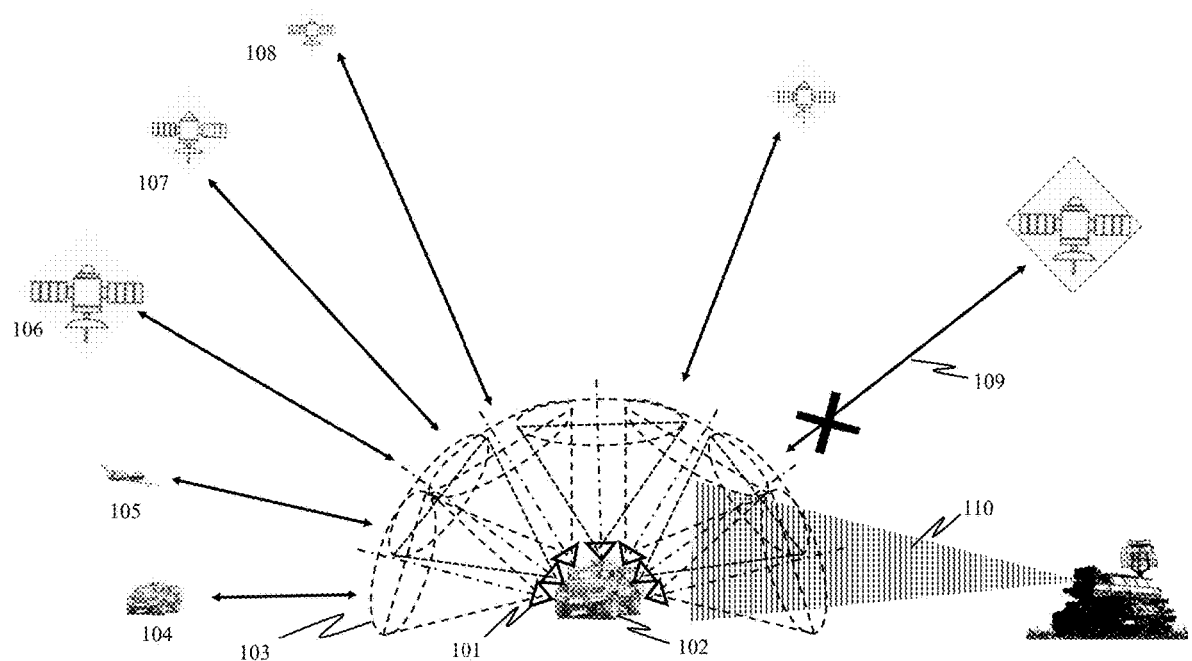
FIG. 4 illustrates a multi-beam multi-band satellite communication system that can be applied for different mode of communication, EMP protection, and satellite signal spoofing.

The first embodiment of a multi-beam multi-band protected satellite communication system which can be applied for a different mode of communications, protection from EMP, and satellite spoofing signals diagrammatically illustrated in FIG. 4. The system comprises an array of directional antennas 101 distributed around the perimeter of vehicle 102. Fixed beams of a subarray of neighboring fixed beam antennas 103 overlap in quadrature or multi-axes directions and simultaneously continuously cover the entire area of possible satellites using. The proposed communication system can provide different modes of communication with ground vehicles 104, airborne vehicles 105, satellites in the constellation of Low Earth (LEO) 106, Medium Earth (MEO) 107, and Geostationary (GEO) orbits 108. Overlap directional antennas provide high-accuracy direction to GPS satellites and can be used for GPS satellites spoof protection 109 by comparing signal source position with real space direction. Distribution of directional antennas around vehicle perimeter provides additional protection against high power electromagnetic pulse 110. The vehicle body provides additional shield covering for antennas not directed to the EMP source.

Figure 5:
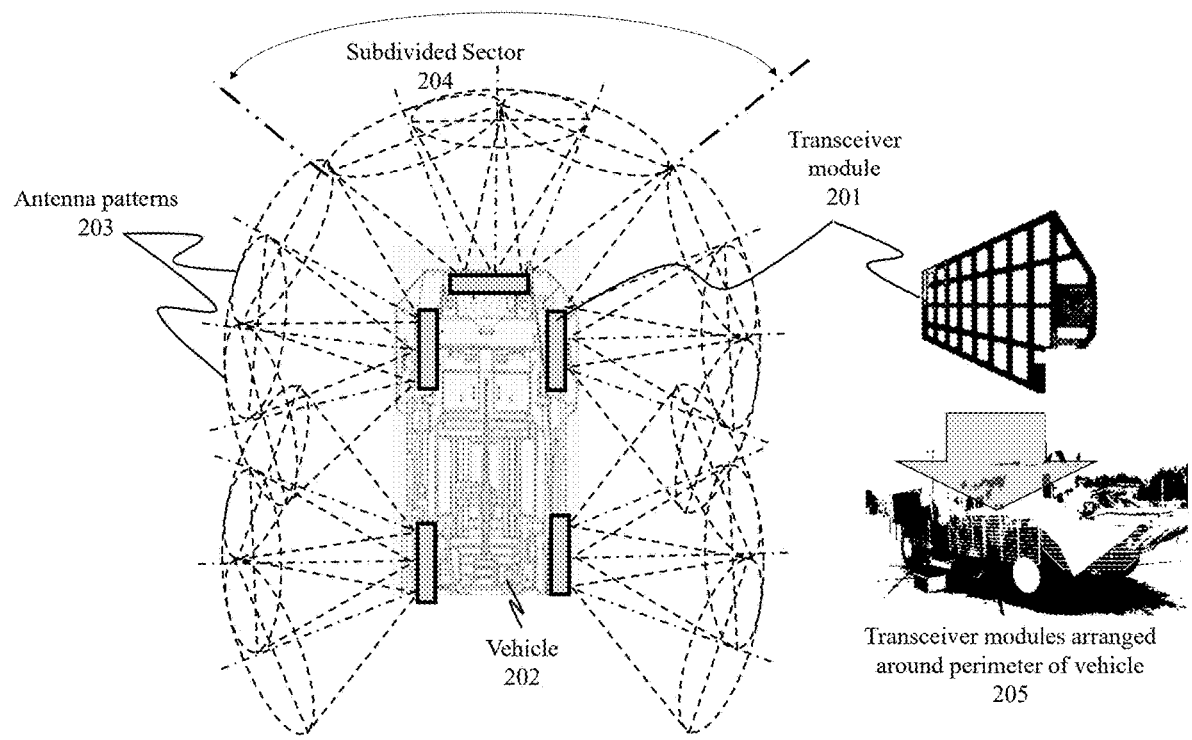
FIG. 5 diagrammatically illustrates the distribution of transceiver modules around the perimeter of the vehicle.

In the proposed communication system plurality of fixed beams antennas coupled with transceiver chains and arranged as transceiver modules 201, which are distributed around vehicle 202 perimeter as shown in FIG. 5. Overlap fixed beams of directional antennas 203 of one transceiver module covering subdivided sector 204 and all transceiver module covering the entire area of possible satellites using. Transceiver modules arranged around the perimeter of the vehicle can provide additional protection for the vehicle against a firearm hitting 205.

Figure 6A:
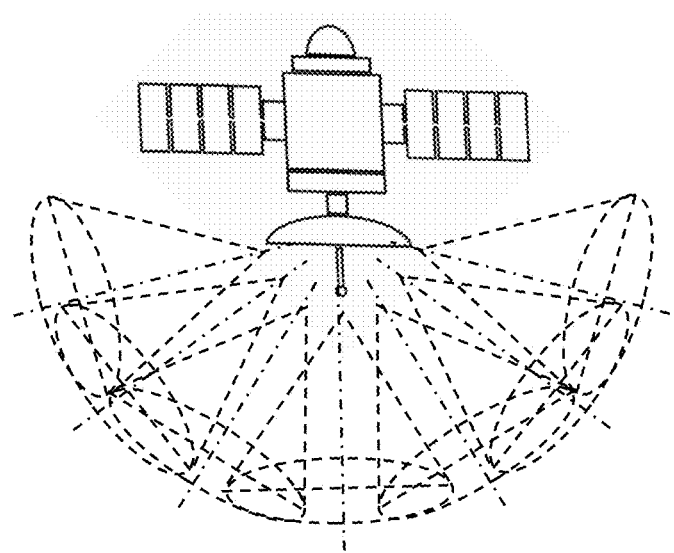
FIG. 6A illustrates the distribution of directional antennas on satellite reflectors with concave surfaces.

FIG. 6A illustrates the distribution of directional antennas on satellite reflectors with concave surfaces.

Figure 6B:
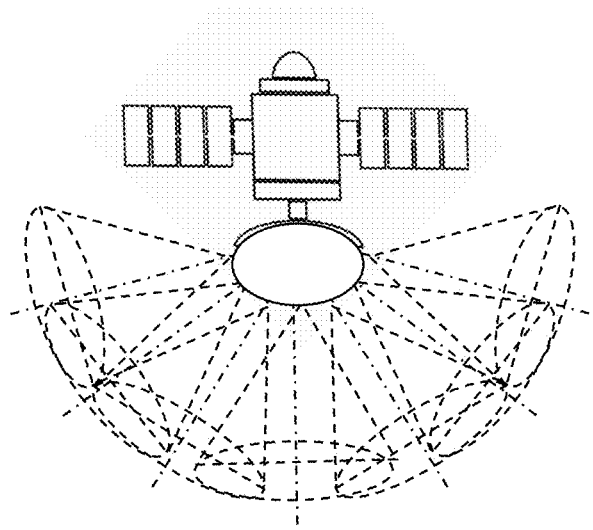
FIG. 6B illustrates the distribution of directional antennas on satellite reflectors with convex surfaces.

FIG. 6B illustrates the distribution of directional antennas on satellite reflectors with convex surfaces.

Figure 7A:
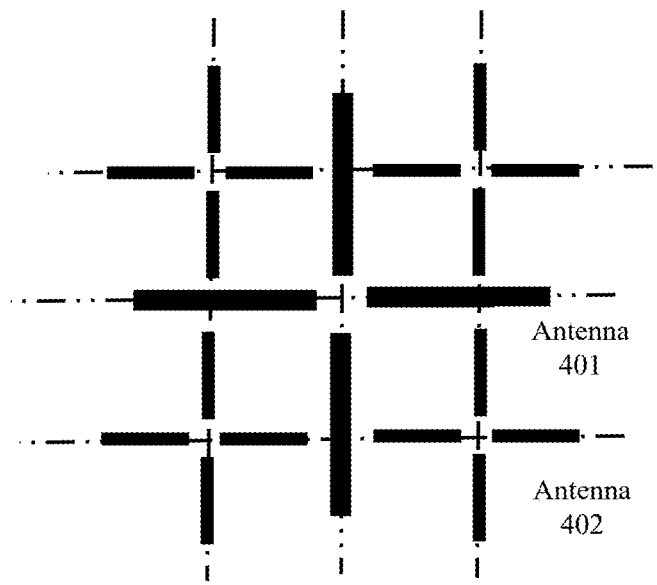
FIG. 7A shows a two-axis distribution of directional antennas within the transceiver module.

FIG. 7A shows the two-axis distribution of directional antennas within the transceiver module.

Figure 7B:
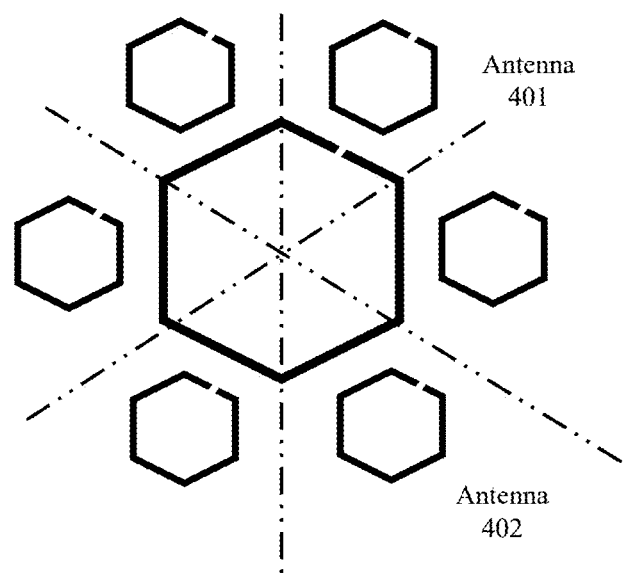
FIG. 7B shows a three-axis distribution of directional antennas within the transceiver module.

FIG. 7B shows a three-axis distribution of directional antennas within the transceiver module.

Figure 8:
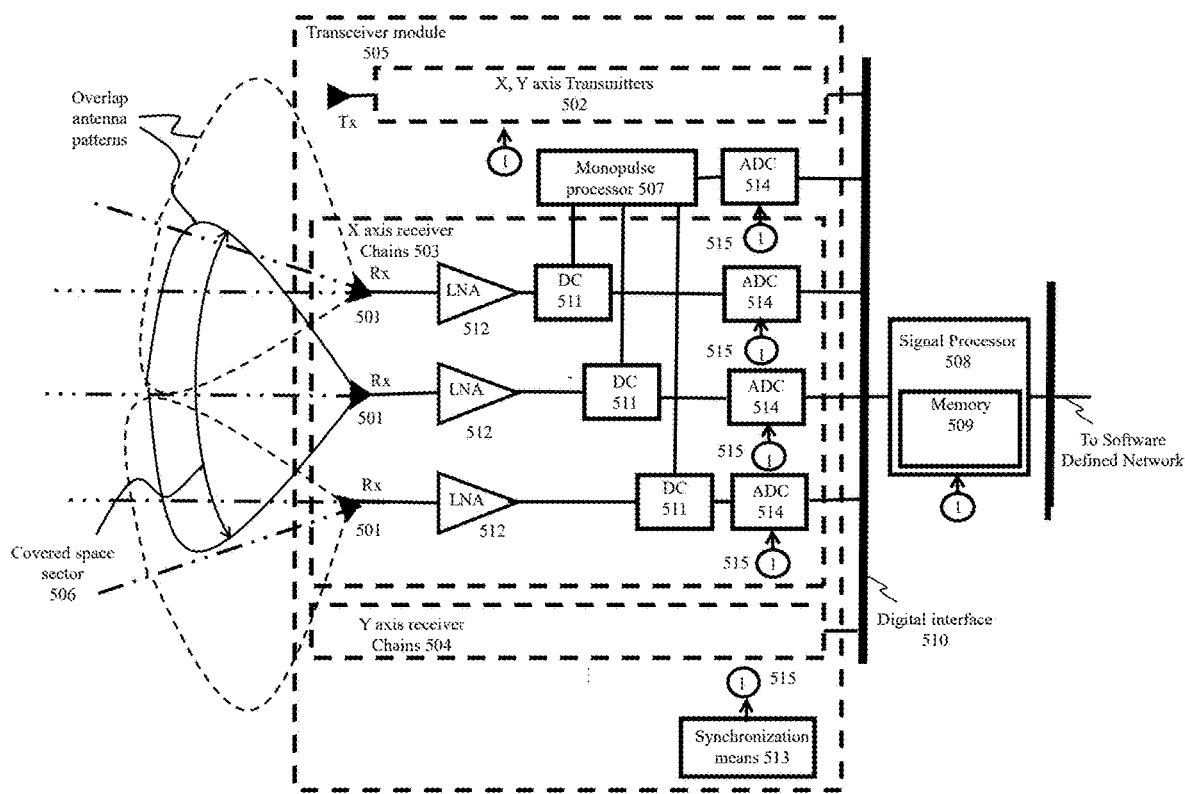
FIG. 8 shows the first embodiment of the transceiver module with an array of directional antennas covering the subdivided sector.

The first embodiment of the transceiver module is illustrated in the diagram in FIG. 8. Each fixed beam antenna 501 is coupled with a separate transceiver chain comprising transmitter 502 and receiving chain 503, 504. The plurality of said fixed beams antennas coupled with transceiver chains arranged as transceiver modules 505 distributed by some order on carrier/satellite, vehicle or distributed between swarm or constellation of carriers/satellites to cover a subdivided sector of possible satellites using area as it shown in FIG. 4. Each transceiver module covering subdivided sector 506 of the entire area of possible satellites using and comprising of monopulse processor 507 for simultaneous multi-axis processing of all signals in receiving chains as ratio of amplitudes and/or phase shift of signals for adjustment signals to decrease pointing error to transmitter and one-iteration adapting to decrease media influence to communication channels parameters by a phase shift in set of neighboring antennas with overlap fixed beams. Each transceiver module comprising an analog-to-digital converter and is also connected to signal processor 508 with memory 509 for storing executable instructions and for separate processing of amplitudes, phases, frequency components shift of signals in receiving chains and transmitters. Fixed beam antennas coupled to separate receiving chains 503, 504, transmitters 502 and monopulse processor 507 inside said transceiver module 505 are connected to the signal processor by digital interface 510, arranged as universal serial bus (USB) or microwave and/or fiber optic waveguides. Each transceiver module comprising separate Automatic Gain Control (AGC) means, comprising signal detector 511 and adjustable low noise amplifier 512 coupled to the receiver chain, and as minimum one transmitter power amplifier, wherein the output of the signal detector connected to control input of transmitter 507 power amplifier and adjustable amplifier in receiver chain 512. All transmitters 502, receiver chains 503, 504, monopulse processor 502 and signal processor 508 comprised Analog to Digital Converters (ADC) 514 connected with synchronization means 513 by digital interface 515.

Figure 9:
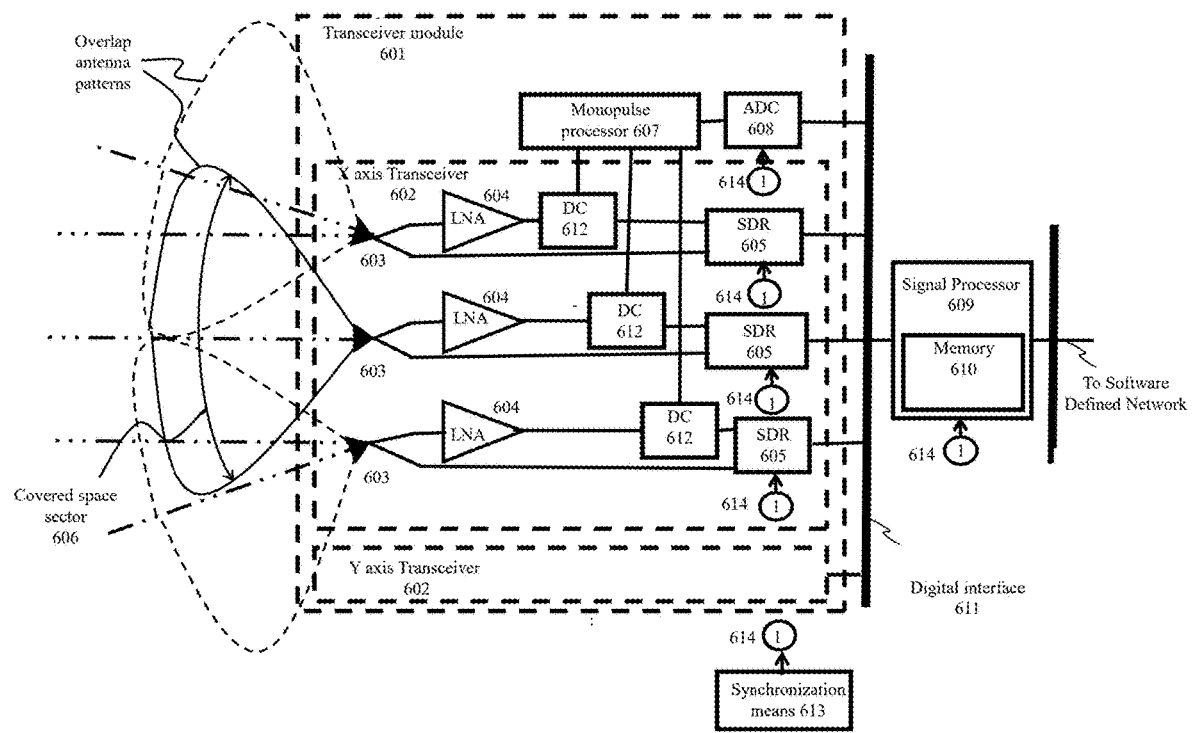
FIG. 9 shows the second embodiment of the transceiver module based on Software Defined Radio (SDR) and an array of directional antennas covering subdivided sector.
Figure 10A:
FIG. 10A and FIG. 10B shows arrays designed with directional antennas with different directional antennas.
Figure 10B:

FIG. 9 shows the second embodiment of the transceiver module based on Software Defined Radio (SDR) and an array of directional antennas covering subdivided sector. In the second embodiment of transceiver module 601 comprising transceiver chain 602, wherein each fixed beam antenna 603 coupled with separate low noise amplifier and SDR 605. The plurality of said fixed beams antennas 603 coupled with transceiver chains 602 arranged as transceiver modules 601 distributed by some order on carrier/satellite, vehicle or distributed between swarm or constellation of carriers/satellites to cover a subdivided sector of possible satellites using area as it shown in FIG. 4. Each transceiver module covering subdivided sector 606 of the entire area of possible satellites using and comprising of monopulse processor 607 connected to analog to digital converter 608 for simultaneous multi-axis processing of all signals in receiving chains as a ratio of amplitudes and/or phase shift of signals for adjustment signals to decrease pointing error to transmitter and one-iteration adapting to decrease media influence to communication channels parameters by a phase shift in set of neighboring antennas with overlap fixed beams. Each transceiver module 601 is also connected to signal processor 609 with memory 610 for storing executable instructions and for separate processing of amplitudes, phases, frequency components shift of signals in receiving chains and transmitters. Fixed beam antennas coupled to separate transceiver receiving chains 602 and monopulse processor 607 inside said transceiver module 601 are connected to signal processor 609 by digital interface 611, arranged as universal serial bus (USB) or microwave and/or fiber optic waveguides. Each transceiver module 601 comprising separate Automatic Gain Control (AGC) means, comprising signal detector 612 and adjustable low noise amplifier 604 coupled to transceiver chain 602, wherein output of signal detector connected to control input of transmitter 607 power amplifier and adjustable amplifier in low noise amplifier 604. All transceiver chains 602, monopulse processor 607, and signal processor 609 are connected with synchronization means 613 by digital interface 614.

REFERENCE NUMBERS

- 101—directional antenna
- 102—vehicle
- 103—fixed beam (antenna pattern with a fixed angle of view)
- 104—vehicle
- 105—airborne vehicle
- 106—LEO
- 107—MEO
- 108—GEO
- 109—spoofing GPS satellite connection
- 110—EMP
- 201—transceiver module
- 202—vehicle
- 203—overlap fixed beams
- 204—subdivided sector
- 205—transceiver modules arranged around perimeter of vehicle
- 501—directional antennas with overlap antenna patterns
- 502—X, Y axis transmitters
- 503—X-axis receiver chains
- 504—Y-axis receiver chains
- 505—transceiver module
- 506—covered space sector
- 507—monopulse processor
- 508—signal processor
- 509—memory
- 510—digital interface
- 511—directional antennas with overlap antenna patterns
- 512—detector
- 513—synchronization means
- 514—analog to digital converter
- 515—digital interface
- 601—transceiver module
- 602—X, Y axis transceivers
- 603—directional antennas
- 604—low noise amplifier
- 605—SDR
- 606—covered space sector
- 607—monopulse processor
- 608—analog to digital converter
- 609—signal processor
- 610—memory
- 611—digital interface
- 612—detector
- 613—synchronization means
- 614—digital interface
- 701—directional antennas design Operation The plurality of fixed beams antennas covering entire areas of using satellites in constellation in Low Earth (LEO), Medium Earth (MEO), Geostationary (GEO) orbits. Fixed beams of neighboring antennas are overlapping in quadrature or multi-axes directions. Each fixed beam antenna coupled with a separate transceiver chain is using as separate transmitting and receiving channels. The plurality of said fixed beams antennas coupled with transceiver chains arranged as transceiver modules distributed by some order on carrier/satellite, vehicle or distributed between swarm or constellation of carriers/satellites to cover a subdivided sector of possible satellites using area. Each transceiver module covering a subdivided sector of the entire area of possible satellites using is comprising of a monopulse processor for simultaneous multi-axis processing of all signals in receiving chains as the ratio of amplitudes and/or phase shift of signals for adjustment signals to decrease pointing error to transmitter and one-iteration adapting to decrease media influence to communication channels parameters by a phase shift in set of neighboring antennas with overlap fixed beams. Each transceiver module comprising an analog-to-digital converter connected to a signal processor with memory for storing executable instructions and for separate processing of amplitudes, phases, frequency components shift of signals in receiving chains and transmitters. Fixed beam antennas coupled to separate receiving chains, transmitters, and monopulse processor inside said transceiver module are connected to the signal processor by digital interface to transmit or receive communication signals by using universal serial bus (USB) or microwave and/or fiber optic waveguides. Automatic Gain Control (AGC) means in each transceiver module detecting received signals and adjusting the level of signals by amplifier coupled to the receiver chain, and transmitter power amplifier, wherein output signal transforming to control input of transmitter power amplifier and adjustable amplifier in the receiver chain. Synchronization means providing synchronization of all transmitters, receiver chains, monopulse processor, and signal processors connected by a digital interface.

CONCLUSION

The time of signal processing is significantly decreased because signals from all satellites and other communication nodes are processing simultaneously by application monopulse signal processing (claim 1, line 15), even compared to processing digitally by switching virtual beamforming receiving signals. For example, a scanning system typically processes only one beam at a time, a holographic staring system processes signals by switching virtual beams, and a monopulse system processing all beams simultaneously.

High gain antennas in monopulse systems provide better gain and sensitivity than holographic systems, where usually applied an array of omnidirectional antennas, which needs to provide a wide area of observation for each antenna array element, and a virtual set of receiving signals antennas activated for a very short time for one separate node. Practically monopulse system will provide the same gain and sensitivity of antennas, as a scanning system with a similar directional antenna.

Monopulse systems can be continuous waves, pulsed [3], or multi-frequency by arrangement of corresponding antennas, claim 2.

The Monopulse method provides better beam pointing accuracy of 2-3 orders than scanning systems. Synchronizing of signals directly in antennas provides high-accuracy amplitude and phase measurement. Non-scanning antenna array is phase/frequency independent and can be multi-frequency, multi-function by application of corresponding arranged antennas, claims 3, 4. All receiving chains using the ratio of amplitudes, phases and relative frequency components shift of signals for multi-axis signal processing. Monopulse means with overlap fixed beams can consist of filters and processing means for separation of clutter signals, and background noise, compensating moving errors.

The invention claimed is:

1. A multi-beam, multi-band communication system comprising multiple satellites positioned in a constellation in Low Earth Orbit (LEO), a Medium Earth Orbit (MEO), or a Geostationary (GEO) orbit, the system further comprising a plurality of fixed beams antennas covering areas of satellites coverage wherein:
   a subarray of neighboring fixed beams antennas are overlapping in quadrature or multi-axes directions and simultaneously continuously covering an entire area of possible satellite coverage;
   each of the neighboring fixed beam antennas coupled with a separate transceiver chain, comprising a transmitter and a receiving chain;
   a plurality of said neighboring fixed beams antennas are coupled with transceiver chains, which are arranged as transceiver modules and distributed in order on a carrier/satellite, or a vehicle or distributed among a constellation of carriers/satellites to cover a subdivided sector of possible satellite coverage area;
   each of the transceiver modules covering the subdivided sector of the entire area of the possible satellite coverage area and comprising of a monopulse processor for simultaneous multi-axis processing of all signals in receiving chains as ratio of amplitudes and/or phase shift of signals for adjustment signals to decrease pointing error to transmitter and one-iteration adapting to decrease influence of medium to communication channels parameters by phase shift in a set of neighboring fixed beam antennas with overlap fixed beams;
   each of the transceiver modules comprising an analog-to-digital converter is connected to a signal processor memory for storing executable instructions and for separate processing of amplitudes, phases, frequency components shift of signals in the receiving chains and transmitters;
   the plurality of fixed beam antennas coupled to separate receiving chains, transmitters, and the monopulse processor inside said transceiver module connected to a signal processor by a digital interface, arranged as a universal serial bus (USB) or microwave and/or fiber optic waveguides;
   each of the transceiver modules comprises a separate Automatic Gain Control (AGC) means, comprising a signal detector and an adjustable amplifier coupled to the receiver chain, and a transmitter power amplifier, wherein an output of the signal detector is connected to a control input of the transmitter power amplifier and an adjustable amplifier in the receiver chain;
   the transmitters and receiver chains, the monopulse processor, and the signal processor connected with synchronization means by the digital interface.

2. The communication system of claim 1, wherein the transceiver modules and the signal processor are arranged for simultaneous transmitting, receiving, and processing signals on different frequencies (multi-frequency signals) and comprising corresponding arranged antennas and filtering means in each transmitter and receiving chain.

3. The communication system of claim 1, wherein the transceiver modules and the signal processor are arranged for simultaneous transmitting, receiving, and processing of different mode signals, such as communication, navigation, control (multi-mode signals) and comprising corresponding arranged antennas and filtering means in each transmitter and receiving chains.

4. The communication system of claim 1, wherein the transceiver modules and the signal processor are arranged for adjustment of communication direction based on return signals status data, based on at least a specified cycle time or a priority of user data being communicated via the subarray of neighboring antennas with the overlap fixed beams.

* * * * *